– Patented July 11, 1944

2,353,282

UNITED STATES PATENT OFFICE 2,353,282

PREPARATION OF SUBSTITUTED PHENOLS

Victor H. Turkington, Mountain Lakes, Leo R. Whiting, Woodbridge, and Lanning P. Rankin, Caldwell, N. J., assignors to Bakelite Corporation, a corporation of New Jersey No Drawing. Application October 15, 1941, Serial No. 415,074

11 Claims. (Cl. 260—624)

This invention relates to the production of substituted phenols by the introduction of alkyl substituents into the nucleus of phenolic compounds. It provides an economical and rapid method for synthesizing substituted phenols, with a minimum of undesirable side reactions and formation of tarry residues; high yields of substituted phenols are obtained in a condition for being readily purified and recovered. The process furthermore is operable at atmospheric pressures with yields of the desired product as high as are obtained by other processes that require high operating pressures for best efficiency.

According to this invention an olefinic compound is condensed with a phenol in the presence of a catalyst composition of an acid or other oxy compound of boron and oxalic acid or one of its compounds; individually neither the oxy-boron compounds or oxalic acid show appreciable catalytic effect in these condensation reactions. The oxy compounds of boron to be used in conjunction with oxalic acid are the oxides of boron of which $B_2O_3$ is typical; metallic borates as

alkali borates exemplified by $Na_2B_4O_7$ and $(NH_4)_2B_4O_7$; organic borates having an alkyl, alkenyl, or aryl group as represented by triamyl borate, allyl borate and tri-phenyl borate; and acids of boron particularly orthoboric acid $(H_3BO_3)$. Oxalic acid or its compounds which are thus effective in conjunction with an oxyboron compound, can be expressed by the formula: ROOC—COOR', wherein R and R' are hydrogen, or an alkyl radical, or an alkenyl radical, or an aryl radical, examples being the mono-alkyl oxalates such as ethyl oxalic acid, and dialkyl oxalates such as diethyl oxalate; and compounds which upon decomposition produce oxalic acid can also be employed to supply the oxalic acid component of the catalyst composition.

The proportion of oxy-boron compound to oxalic acid or one of its compounds in the catalyst composition may vary within wide limits and yet form an active catalyst composition for the condensation of olefinic compounds with phenols to yield substituted phenols. In the use of a specific catalyst composition particularly good yields were obtained when the catalyst composition comprised one mol of ortho boric acid per mol of oxalic acid. The minimum quantity of oxyboron compound required to form an active catalyst composition with oxalic acid is about 0.01% based on the weight of the reactant materials, and about 0.05% of oxalic acid should be present to obtain a reasonable speed of reaction; with lesser amounts of oxalic acid present in the catalyst compositions, however, definite catalytic effect on the speed of the condensation reaction is observable. There is no maximum limit on the amount of the total catalyst composition which may be present in the reactant materials, since these catalyst compositions cause a controllable reaction to occur even when there is present as much as 10 to 20% of catalyst composition based on the weight of the reactant materials. However, when advantage is taken of the effectiveness of small amounts of these catalyst compositions, the cost of manufacturing these substituted phenols on a large scale can be considerably reduced.

In general, the catalyst compositions may be effectively employed in condensation reactions of olefinic compounds with phenolic compounds, examples of which are: the mono-hydroxy phenols such as phenol, its alkyl substituted derivatives such as the isomeric cresols and xylenols, and the aryl substituted derivatives including the phenyl phenols and benzyl phenols; di- and polyhydroxy phenols of which resorcinol and pyrogallol are examples; and also polynuclear phenols for instance naphthol. For substituting an alkyl radical for a hydrogen atom attached to one of the nuclear carbon atoms in the benzene ring of these phenolic compounds, the members of the olefine series such as propene, butene, pentene, heptene, octene, etc., as well as their isomers and polymers are particularly desirable because of their low cost and availability; by using these olefines with the catalyst compositions, alkylated phenols are produced in high yields and with the absence of the tars which usually accompany these condensation reactions when other catalysts such as sulphuric acid or aluminum chloride are employed.

In the practice of the invention with respect to alkylating phenols with for example olefines supplying the desired alkyl groups, the catalyst composition—which may consist of one mol of boric acid per mol of oxalic acid and be ground to a fine powder for ready dispersal in the reactant materials—is first heated with the particular phenol to be alkylated to moderate temperatures, 100° C. to 160° C., to provide for substantial dispersion of the catalyst composition in the phenol; such initial treatment of the catalyst composition greatly improved its catalytic activity. The olefine, if it exists in the gaseous state at the temperature chosen for the alkylation, is slowly bubbled through the phenol containing the well dispersed catalyst composition. The quantity of olefine to be introduced in the phenol is determined by the type of alkylated phenol to be produced; thus if only one alkyl radical is to be substituted in the benzene ring for a nuclear hydrogen atom, an excess of phenol over the theoretical amount necessary for a single alkyl radical to every phenol molecule is required when employing these catalyst compositions, in order to favor mono substitution rather than di substitution of the phenol. Similarly if more than one hydrogen is to be replaced by alkyl groups, a larger quantity of olefine is supplied to the phenol. When analytical examination indicates that the alkylation reaction has proceeded to equilibrium, the catalyst composition if desired can be neutralized by preferably a weak alkali such as sodium carbonate to prevent undue loss of the alkylated phenol which would occur with stronger alkalis because of the resultant formation of alkali phenates. Neutralization of the catalyst composition by an alkali is not necessary, however, and in fact is somewhat undesirable economically, since heating the reaction products without neutralization to above 180° C. decomposes the oxalic acid component of the catalyst composition into formic acid and carbon dioxide, and the formic acid is removed by subsequent fractional distillation of the reaction products; the boric acid component of the catalyst composition then remains behind in the reaction vessel to be utilized again in a catalyst composition for a subsequent batch of reactant materials upon adding oxalic acid. The reaction products can be separated from the unreacted phenol and hydrocarbons by fractional distillation.

By conducting the substitution reaction within certain temperature ranges, the catalyst compositions are effective in directing the point of substitution on the phenol nucleus; for example with a catalyst composition of about 1 per cent boric acid and 3 per cent of oxalic acid and a low operating temperature condition of about 45° C. in the case of phenol ($C_6H_5OH$) there results the substitution in the ortho position, whereas at about 80° C. about 5 per cent of the ortho substituted phenol is produced, the remaining being a substitution in the para position.

The catalyst compositions are also effective when used in high pressure reactions and are employed in practically the same manner. Although as previously mentioned high pressure reacting conditions are not required when using these catalyst compositions, occasionally when it is essential to prevent loss of unreacted olefine, or where suitable means for introducing gaseous olefines in a slow steady stream are lacking, high pressure vessels equipped for heating, cooling and agitation can be utilized. When liquid olefines, such as the isomeric amylenes or the liquid olefine polymers of which di-isobutylene is an instance, are the alkylating agents, the condensation process consists in merely mixing together the required quantities of the phenol and liquid olefine in the presence of the catalyst composition and heating to a suitable reacting temperature.

Substituted phenols of high molecular weight are obtained when phenols are condensed with diolefines, butadiene, isoprene, etc., in the presence of these catalyst compositions; depending on the particular diolefine and amount of substitution of the phenol molecule, viscous to solid resinous bodies are obtained. They are soluble in drying oils to give air-drying varnishes and vehicles for paints. Since the diolefines contain two unsaturated carbon-to-carbon linkages and since an unsubstituted phenol molecule contains three reactive positions in the two ortho and one para positions of the ring, cross linking of individual substituted phenol molecules is possible during the condensation reaction; a reaction of this type does occur especially when one molecule of a diolefine is condensed with two molecules of a phenol. The procedure for condensing diolefines with phenols is similar to that already described for the simple olefines; the catalyst composition is preferably well dispersed in the phenol by heating to a temperature of about 120° C., temperatures over 150° C. being avoided since the oxalic acid component of the catalyst composition then tends to decompose; the phenolic compound containing the dispersed catalyst composition is cooled to a temperature below 100° C., and the diolefine is then introduced in an amount sufficient to produce the desired amount of substitution. The catalyst composition of this invention so accelerates this condensation reaction that the diolefine compound can be introduced into the phenolic compound at rather high rates of flow and yet have the greater portion of the diolefine condense with the phenol.

The following examples illustrate the general technic and efficiency of the catalyst compositions of this invention in promoting the condensation reactions of the various phenols with olefinic compounds.

*Example 1.*—2 mols (188 grams) of phenol ($C_6H_5OH$) and a catalyst composition of 1.88 grams boric acid and 5.64 grams of oxalic acid were heated together to 130° C. for 20 minutes in a glass vessel fitted with a reflux column and stirring apparatus. The catalyst composition as a result of this heat treatment apparently dissolved, the solution becoming orange red in color. 56 grams (1 mol) of isobutylene were slowly pumped into the phenol catalyst composition mixture at about 45° C. while the contents of the vessel were kept well agitated; and since the substitution reaction proceeded so rapidly, no pressure higher than atmospheric was necessary to prevent the loss of unreacted isobutylene. Fractional distillation of a sample of the reaction mass previously neutralized with sodium carbonate showed about 25 per cent of ortho butyl phenol; but heating the reaction mass in the presence of the original catalyst composition to a temperature of 140° C. and holding it there for one hour resulted in a conversion of the ortho butyl phenol to para butyl phenol as shown by examination of the distillates obtained from fractional distillation. A careful analysis of the fractional distillation cuts of the reaction mass demonstrated that all the isobutylene combined with the phenol and the reaction mass contained the following products:

| | Grams |
|---|---|
| Phenol | 104.4 |
| Para-tertiary butyl phenol | 117.0 |
| Di-tertiary butyl phenol | 22.7 |
| Isobutylene | 0.0 |

In other experiments, direct formation of para-tertiary butyl phenol was obtained by introducing the isobutylene to the phenol-catalyst composition mixture which was maintained at a temperature of 120° C. during the entire period of adding the isobutylene. The activity of the catalyst composition was further demonstrated by cooling the phenol with the catalyst composition distributed therein to 0° C. and below and passing isobutylene over the solidified mass; the substitution proceeded with marked activity at the contacted surface under these conditions.

*Example 2.*—Amyl phenol was prepared by condensing a mixture of isomeric amylenes with phenol ($C_6H_5OH$) in the presence of a similar catalyst composition. 91.2 grams of phenol and 34.0 grams of a mixture of isomeric amylenes were reacted together at a temperature of 150° C. for 45 minutes in a pressure-resisting vessel under pressure of hydrogen gas to suppress boiling of the amylenes, and the catalyst was composed of 3.2 grams oxalic acid and 0.45 gram boric acid. Fractionally distilling the contents of the vessel gave the following products:

| | Grams |
|---|---|
| Unreacted amylenes | 13.5 |
| Unreacted phenol | 76.5 |
| Amyl phenol | 20.0 |
| Residue | 10.0 |
| | 120.0 |

The 5 grams lost were probably due to the low boiling point of the amylenes.

Repeating the experiment and using the same quantities of reactant materials and catalyst composition, the reaction was conducted at atmospheric pressure, giving a lower yield of substituted phenol, accountable for by loss of low boiling amylenes during the reaction period.

*Example 3.*—91.2 grams of phenol ($C_6H_5OH$) and 54.4 grams of di-isobutylene (2,4,4-trimethyl pentene-2) were heated with a catalyst composition comprising 0.45 gram boric acid and 3.2 grams oxalic acid in a vessel fitted with a reflux column and means for agitation. The temperature was brought up to 100° C. by external heating, and there discontinued because a mild exothermic reaction occurred which persisted for 5 minutes. External heating was again applied, to increase the temperature to 135° C. and held there for 15 minutes. The contents of the vessel were then fractionally distilled, yielding the following products:

| | Grams |
|---|---|
| Hydrocarbons | 3.5 |
| Phenol | 53.5 |
| Ortho-tertiary octyl phenol | 3.0 |
| Para-tertiary octyl phenol | 76.5 |
| Higher substituted phenols | 7.0 |
| Total products | 143.5 |

*Example 4.*—236 grams of phenol ($C_6H_5OH$) and a catalyst composition of 2.0 grams boric acid and 7.0 grams of oxalic acid were heated to 150° C. in a vessel fitted with good stirring means. When the catalyst composition was completely dispersed in the phenol, the phenol was cooled to 110° C., and held there, while butadiene gas was bubbled through the reaction mixture causing a slight exothermic reaction. When about 68 grams of butadiene gas, calculated by the weight increase of the phenol, had been absorbed, the rate of absorption decreased measurably, and no further exothermic reaction occurred; the amount of butadiene absorbed was equivalent to one mol of butadiene to one mol of phenol. The product was steam distilled to 243° C., leaving 185 grams of a residue having resinous properties. This resin had a melting point of 170° F. and was soluble in tung oil to make a satisfactory air drying varnish.

*Example 5.*—100 grams meta-cresol and 15 grams of propylene gas with a catalyst composition of 1 gram boric acid and 3 grams oxalic acid were heated to 140° C. in a steel bomb for several hours. Removing the contents from the bomb and fractionally distilling, it was found that a considerable amount of 1-methyl-3-hydroxy-4-isopropyl benzene (thymol) had been formed together with other substituted phenols which were isomeric with thymol. These substituted phenols are useful as germicides.

In a similar manner other substituted phenols, such as the xylenols and cresols, can be employed, and they can be condensed with the various propylenes, butylenes, amylenes, hexenes, and higher members of the mono olefine series to form a large number of different substituted phenols.

*Example 6.*—91.2 grams of phenol, 2 grams boric acid ($B_2O_3$) and 4 grams oxalic acid hydrate were heated to 125° C. to form a catalyst-containing composition. This was cooled to 100° C. and 54.4 grams of di-isobutylene were added; the reaction was exothermic with the temperature rising to 130° C., and the mass was heated to 145° C. for one hour. A fractional distillation of the reaction mass gave the following:

| | Per cent |
|---|---|
| Hydrocarbons | 2.4 |
| Phenol | 37.6 |
| Ortho-tertiary octyl phenol | 2.0 |
| Para-tertiary octyl phenol | 53.0 |
| Higher substituted phenols | 5.0 |
| | 100.0 |

In the appended claims it is intended by the expression "olefinic compound" to include the organic compounds having one or more double bonds such as the olefines and diolefines, their isomers and polymers.

What is claimed is:

1. Method of preparing a substitution product of a phenol which comprises reacting the phenol with an olefinic compound in the presence of a catalyst composition of an oxy compound of boron and a compound of the formula ROOC—COOR' wherein R and R' represent each a member from the group consisting of hydrogen, alkyl radicals, alkenyl radicals and aryl radicals.

2. Method of preparing a substitution product of a phenol which comprises reacting the phenol with an olefine in the presence of a catalyst composition of an oxy compound of boron and oxalic acid.

3. Method of preparing an alkylated phenol which comprises reacting the phenol with an olefinic compound in the presence of a catalyst composition of an oxy compound of boron and oxalic acid.

4. Method of promoting the formation of an ortho-substituted phenol which comprises reacting a phenol with an olefinic compound in the presence of a catalyst composition of an oxy compound of boron and oxalic acid, and controlling the temperature of the reaction below 80° C.

5. Method of manufacturing a para alkyl substituted phenol which comprises reacting together a phenol and an olefinic compound in the presence of a catalyst composition comprising an oxy compound of boron and a compound of the formula ROOC—COOR' wherein R and R' represent each a member from the group consisting of hydrogen, alkyl radicals, alkenyl radicals and aryl radicals at a temperature sufficiently high but below 180° C. to cause a substantial amount of para alkylated phenol to be produced.

6. Method of manufacturing a tertiary butyl phenol which comprises reacting together isobutylene and phenol in the presence of a catalyst composition of an oxy compound of boron and oxalic acid.

7. Method of manufacturing a tertiary octyl phenol which comprises reacting together di-isobutylene and phenol in the presence of a catalyst composition of an oxy compound of boron and oxalic acid.

8. Method of manufacturing para tertiary butyl phenol which comprises reacting together at temperature above 100° C. phenol and isobutylene in the presence of a catalyst composition of an oxy compound of boron and oxalic acid.

9. Method of manufacturing para tertiary octyl phenol which comprises heating together at a temperature above 100° C. phenol and di-isobutylene in the presence of a catalyst composition of an oxy compound of boron and oxalic acid.

10. Method of manufacturing an alkylated phenol which comprises heating to a temperature below about 180° C., a phenol and a catalyst composition of an oxy compound of boron and a compound of the formula ROOC—COOR' wherein R and R' represent each a member from the group consisting of hydrogen, alkyl radicals, alkenyl radicals and aryl radicals, and thereafter reacting with an olefinic compound.

11. Method of manufacturing an alkylated phenol which comprises heating to a temperature below about 180° C., a phenol and a catalyst composition of boric acid and oxalic acid and thereafter reacting with an olefinic compound.

VICTOR H. TURKINGTON.
LEO R. WHITING.
LANNING P. RANKIN.

CERTIFICATE OF CORRECTION.

Patent No. 2,353,282. July 11, 1944.

VICTOR H. TURKINGTON, ET AL.

It is hereby certified that error appears in the printed specification of the above numbered patent requiring correction as follows: Page 3, second column, line 18, Example 6, for "boric acid" read --boric oxide--; and that the said Letters Patent should be read with this correction therein that the same may conform to the record of the case in the Patent Office.

Signed and sealed this 29th day of August, A. D. 1944.

(Seal)

Leslie Frazer
Acting Commissioner of Patents.